US009886674B2

(12) United States Patent
Friedlander et al.

(10) Patent No.: US 9,886,674 B2
(45) Date of Patent: *Feb. 6, 2018

(54) DESCRIBING A PARADIGMATIC MEMBER OF A TASK DIRECTED COMMUNITY IN A COMPLEX HETEROGENEOUS ENVIRONMENT BASED ON NON-LINEAR ATTRIBUTES

(71) Applicant: International Business Machines Corporation, Armonk, NY (US)

(72) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,169

(22) Filed: Jul. 25, 2016

(65) Prior Publication Data
US 2016/0335573 A1 Nov. 17, 2016

Related U.S. Application Data

(63) Continuation of application No. 12/903,302, filed on Oct. 13, 2010, now Pat. No. 9,443,211.

(51) Int. Cl.
*G06F 17/30* (2006.01)
*G06Q 10/06* (2012.01)

(52) U.S. Cl.
CPC . *G06Q 10/06311* (2013.01); *G06F 17/30312* (2013.01)

(58) Field of Classification Search
CPC .. G06F 17/30575; G06F 8/71; G06F 17/3089; G06F 17/30522; G06F 17/30569; G06F 17/30595; G06F 17/30702

See application file for complete search history.

(56) References Cited

U.S. PATENT DOCUMENTS

| 4,890,227 A | 12/1989 | Watanabe et al. |
| 5,070,453 A | 12/1991 | Duffany |

(Continued)

OTHER PUBLICATIONS

U.S. Appl. No. 12/884,665—Final Office Action dated Oct. 18, 2012.

(Continued)

*Primary Examiner* — Angelica Ruiz
(74) *Attorney, Agent, or Firm* — John R. Pivnichny; Law Office of Jim Boice

(57) ABSTRACT

A processor marks non-linear attributes of each member of a known cohort by marking fields associated with the non-linear attributes in a database used to store information about members of the known cohort, where the known cohort is a task directed community that has a known agenda, where each of the non-linear attributes is individually unrelated to the known agenda, and where there is no logical nexus between any of the non-linear attributes and a particular person's membership in the known cohort. The processor utilizes marked fields in the database to identify common non-linear attributes that are shared by multiple members of the known cohort, and defines a paradigmatic member of the known cohort. The processor maps and tags the paradigmatic member in the database for future retrieval.

20 Claims, 4 Drawing Sheets

(56) References Cited

U.S. PATENT DOCUMENTS

| | | | |
|---|---|---|---|
| 5,111,391 A | 5/1992 | Fields et al. | |
| 5,128,871 A | 7/1992 | Schmitz | |
| 5,148,365 A | 9/1992 | Dembo | |
| 5,216,593 A | 6/1993 | Dietrich et al. | |
| 5,764,740 A | 6/1998 | Holender | |
| 5,838,918 A | 11/1998 | Prager et al. | |
| 5,880,598 A | 3/1999 | Duong | |
| 6,012,051 A * | 1/2000 | Sammon, Jr. | G06Q 30/02 705/26.2 |
| 6,021,403 A | 2/2000 | Horvitz et al. | |
| 6,049,776 A | 4/2000 | Donnelly et al. | |
| 6,076,166 A | 6/2000 | Moshfeghi et al. | |
| 6,102,856 A | 8/2000 | Groff et al. | |
| 6,164,975 A | 12/2000 | Weingarden et al. | |
| 6,212,524 B1 | 4/2001 | Weissman et al. | |
| 6,272,483 B1 | 8/2001 | Joslin et al. | |
| 6,289,340 B1 | 9/2001 | Puram et al. | |
| 6,321,207 B1 | 11/2001 | Ye | |
| 6,449,641 B1 | 9/2002 | Moiin et al. | |
| 6,484,155 B1 | 11/2002 | Kiss et al. | |
| 6,578,068 B1 | 6/2003 | Bowman-Amuah | |
| 6,604,160 B1 | 8/2003 | Le et al. | |
| 6,647,374 B2 | 11/2003 | Kansal | |
| 6,675,159 B1 | 1/2004 | Lin et al. | |
| 6,905,816 B2 | 6/2005 | Jacobs et al. | |
| 6,937,147 B2 | 8/2005 | Dilbeck et al. | |
| 6,954,736 B2 | 10/2005 | Menninger et al. | |
| 7,181,428 B2 | 2/2007 | Lawrence | |
| 7,213,009 B2 | 5/2007 | Pestotnik et al. | |
| 7,295,925 B2 | 11/2007 | Breed et al. | |
| 7,343,316 B2 | 3/2008 | Goto et al. | |
| 7,400,257 B2 | 7/2008 | Rivas | |
| 7,403,922 B1 | 7/2008 | Lewis et al. | |
| 7,460,019 B2 | 10/2008 | Henderson | |
| 7,457,764 B1 | 11/2008 | Bullock et al. | |
| 7,464,147 B1 | 12/2008 | Fakhouri et al. | |
| 7,516,142 B2 | 4/2009 | Friedlander et al. | |
| 7,523,118 B2 | 4/2009 | Friedlander et al. | |
| 7,526,442 B2 | 4/2009 | Edgar et al. | |
| 7,539,623 B1 | 5/2009 | Wyatt | |
| 7,558,745 B2 | 7/2009 | Cullen et al. | |
| 7,584,160 B2 | 9/2009 | Friedlander et al. | |
| 7,630,948 B2 | 12/2009 | Friedlander et al. | |
| 7,630,986 B1 | 12/2009 | Herz et al. | |
| 7,647,286 B2 | 1/2010 | Friedlander et al. | |
| 7,647,288 B2 | 1/2010 | Friedlander et al. | |
| 7,693,736 B1 | 4/2010 | Chu et al. | |
| 7,702,605 B2 | 4/2010 | Friedlander et al. | |
| 7,739,606 B2 | 6/2010 | Sawada et al. | |
| 7,752,154 B2 | 7/2010 | Friedlander et al. | |
| 7,801,885 B1 | 9/2010 | Verma | |
| 7,930,262 B2 | 4/2011 | Friedlander et al. | |
| 7,933,228 B2 | 4/2011 | Coley | |
| 8,001,008 B2 | 8/2011 | Engle | |
| 8,010,516 B2 | 8/2011 | Ishii et al. | |
| 8,055,603 B2 | 11/2011 | Angell et al. | |
| 8,204,779 B1 | 6/2012 | Hughes et al. | |
| 2001/0034362 A1 | 10/2001 | Wilkinson | |
| 2002/0019764 A1 | 2/2002 | Mascarenhas | |
| 2002/0052756 A1 | 5/2002 | Lomangino | |
| 2002/0059201 A1 | 5/2002 | Work | |
| 2002/0107824 A1 | 8/2002 | Ahmed et al. | |
| 2002/0111922 A1 | 8/2002 | Young et al. | |
| 2002/0115447 A1 | 8/2002 | Martin et al. | |
| 2002/0182573 A1 | 12/2002 | Watson | |
| 2003/0033180 A1 | 2/2003 | Shekar et al. | |
| 2003/0065544 A1 | 4/2003 | Elzinga et al. | |
| 2003/0088491 A1 | 5/2003 | Liu et al. | |
| 2003/0097291 A1 | 5/2003 | Freedman | |
| 2003/0140063 A1 | 7/2003 | Pizzorno et al. | |
| 2003/0177038 A1 | 9/2003 | Rao | |
| 2003/0220830 A1 | 11/2003 | Myr | |
| 2003/0220860 A1 | 11/2003 | Heytens et al. | |
| 2004/0006694 A1 | 1/2004 | Heelan et al. | |
| 2004/0122787 A1 | 6/2004 | Avinash et al. | |
| 2004/0243422 A1 | 12/2004 | Weber et al. | |
| 2004/0267595 A1 | 12/2004 | Woodings et al. | |
| 2005/0004823 A1 | 1/2005 | Hnatio | |
| 2005/0004828 A1 | 1/2005 | Desilva et al. | |
| 2005/0038608 A1 | 2/2005 | Chandra et al. | |
| 2005/0060099 A1 * | 3/2005 | Sorrells | G01V 1/30 702/14 |
| 2005/0080806 A1 | 4/2005 | Doganata et al. | |
| 2005/0101873 A1 | 5/2005 | Misczynski et al. | |
| 2005/0144062 A1 | 6/2005 | Mittal et al. | |
| 2005/0149466 A1 | 7/2005 | Hale et al. | |
| 2005/0165594 A1 | 7/2005 | Chandra et al. | |
| 2005/0198486 A1 | 9/2005 | Desmond et al. | |
| 2005/0222989 A1 | 10/2005 | Haveliwala et al. | |
| 2006/0010090 A1 | 1/2006 | Brockway et al. | |
| 2006/0031110 A1 | 2/2006 | Benbassat et al. | |
| 2006/0036560 A1 | 2/2006 | Fogel | |
| 2006/0069514 A1 | 3/2006 | Chow et al. | |
| 2006/0105830 A1 | 5/2006 | Nemitz et al. | |
| 2006/0155627 A1 | 7/2006 | Horowitz | |
| 2006/0184412 A1 | 8/2006 | Kagan et al. | |
| 2006/0194186 A1 | 8/2006 | Nanda | |
| 2006/0200435 A1 | 9/2006 | Flinn et al. | |
| 2006/0218010 A1 | 9/2006 | Michon et al. | |
| 2006/0226991 A1 | 10/2006 | Rivas | |
| 2006/0240668 A1 | 10/2006 | Rolia et al. | |
| 2006/0294085 A1 | 12/2006 | Rose et al. | |
| 2007/0073654 A1 | 3/2007 | Chow et al. | |
| 2007/0073754 A1 | 3/2007 | Friedlander et al. | |
| 2007/0073799 A1 | 3/2007 | Adjali et al. | |
| 2007/0112735 A1 | 5/2007 | Holloway et al. | |
| 2007/0150325 A1 | 6/2007 | Bjornson | |
| 2007/0168307 A1 | 7/2007 | Floudas et al. | |
| 2007/0174090 A1 | 7/2007 | Friedlander et al. | |
| 2007/0174091 A1 | 7/2007 | Friedlander et al. | |
| 2007/0174101 A1 | 7/2007 | Li et al. | |
| 2007/0179356 A1 | 8/2007 | Wessel | |
| 2007/0185737 A1 | 8/2007 | Friedlander et al. | |
| 2007/0198937 A1 | 8/2007 | Paris | |
| 2007/0203872 A1 | 8/2007 | Flinn et al. | |
| 2007/0244701 A1 | 10/2007 | Erlanger et al. | |
| 2007/0274337 A1 | 11/2007 | Purpura | |
| 2008/0015871 A1 | 1/2008 | Eder | |
| 2008/0028409 A1 | 1/2008 | Cherkasova et al. | |
| 2008/0065576 A1 | 3/2008 | Friedlander et al. | |
| 2008/0077463 A1 | 3/2008 | Friedlander et al. | |
| 2008/0082356 A1 | 4/2008 | Friedlander et al. | |
| 2008/0082374 A1 | 4/2008 | Kennis et al. | |
| 2008/0147694 A1 | 6/2008 | Ernest et al. | |
| 2008/0155104 A1 | 6/2008 | Quinn et al. | |
| 2008/0167929 A1 | 7/2008 | Cao et al. | |
| 2008/0172352 A1 | 7/2008 | Friedlander et al. | |
| 2008/0177687 A1 | 7/2008 | Friedlander et al. | |
| 2008/0177688 A1 | 7/2008 | Friedlander et al. | |
| 2008/0189402 A1 | 8/2008 | Betzler et al. | |
| 2008/0208801 A1 | 8/2008 | Friedlander et al. | |
| 2008/0208813 A1 | 8/2008 | Friedlander et al. | |
| 2008/0208814 A1 | 8/2008 | Friedlander et al. | |
| 2008/0208832 A1 | 8/2008 | Friedlander et al. | |
| 2008/0208838 A1 | 8/2008 | Friedlander et al. | |
| 2008/0208875 A1 | 8/2008 | Friedlander et al. | |
| 2008/0208901 A1 | 8/2008 | Friedlander et al. | |
| 2008/0208902 A1 | 8/2008 | Friedlander et al. | |
| 2008/0208903 A1 | 8/2008 | Friedlander et al. | |
| 2008/0208904 A1 | 8/2008 | Friedlander et al. | |
| 2008/0209493 A1 | 8/2008 | Choi et al. | |
| 2008/0246629 A1 | 10/2008 | Tsui et al. | |
| 2008/0263012 A1 * | 10/2008 | Jones | G06F 17/30811 |
| 2008/0281974 A1 | 11/2008 | Slothouber et al. | |
| 2008/0288862 A1 | 11/2008 | Smetters et al. | |
| 2008/0294459 A1 | 11/2008 | Angell et al. | |
| 2008/0294692 A1 | 11/2008 | Angell et al. | |
| 2009/0024553 A1 | 1/2009 | Angell et al. | |
| 2009/0106179 A1 | 4/2009 | Friedlander et al. | |
| 2009/0112670 A1 | 4/2009 | Black et al. | |
| 2009/0138300 A1 | 5/2009 | Kagan et al. | |
| 2009/0198733 A1 | 8/2009 | Gounares et al. | |
| 2009/0287503 A1 | 11/2009 | Angell et al. | |
| 2009/0287674 A1 | 11/2009 | Bouillet et al. | |

(56) References Cited

U.S. PATENT DOCUMENTS

| | | | |
|---|---|---|---|
| 2009/0287683 | A1 | 11/2009 | Bennett |
| 2009/0299766 | A1 | 12/2009 | Friedlander et al. |
| 2009/0299928 | A1 | 12/2009 | Kongtcheu |
| 2010/0010832 | A1 | 1/2010 | Boute et al. |
| 2010/0042456 | A1 | 2/2010 | Stinchcombe et al. |
| 2010/0063877 | A1 | 3/2010 | Soroca et al. |
| 2010/0077438 | A1 | 3/2010 | Ansari |
| 2010/0131028 | A1 | 5/2010 | Hsu et al. |
| 2010/0191516 | A1 | 7/2010 | Benish et al. |
| 2010/0223581 | A1 | 9/2010 | Manolescu et al. |
| 2010/0228715 | A1 | 9/2010 | Lawrence |
| 2011/0054968 | A1 | 3/2011 | Galaviz |
| 2011/0093287 | A1 | 4/2011 | Dicks et al. |
| 2011/0275907 | A1 | 11/2011 | Inciardi et al. |
| 2011/0301967 | A1 | 12/2011 | Friedlander et al. |
| 2012/0035971 | A1 | 2/2012 | Friedlander et al. |
| 2012/0059815 | A1 | 3/2012 | Friedlander et al. |
| 2012/0072460 | A1 | 3/2012 | Friedlander et al. |
| 2012/0096032 | A1 | 4/2012 | Brackett et al. |
| 2012/0108984 | A1 | 5/2012 | Bennett et al. |

OTHER PUBLICATIONS

U.S. Appl. No. 12/795,847—Non-Final Office Action dated Nov. 26, 2012.
U.S. Appl. No. 12/851,995—Final Office Action dated Nov. 8, 2012.
U.S. Appl. No. 13/253,431—Non-Final Office Action dated Jan. 3, 2013.
U.S. Appl. No. 12/903,376—Non-Final Office Action dated Jul. 30, 2012.
U.S. Appl. No. 12/875,261—Notice of Allowance dated Sep. 27, 2012.
Phillip E. Hayes et al., "Picking Up the Pieces: Utilizing Disaster Recovery Project Management to Improve Readiness and Response Time," IEEE Industry Applications Magazine, Nov./Dec. 2002, pp. 1-10 (Abstract).
Kun Wang et al, "A Mathematical Approach to Disaster Recovery Planning," Proceedings of the First International Conference on Semantics, Knowledge, and Grid, 2005, pp. 1-3 (Abstract).
E. A. Silver, "An Overview of Heuristic Solution Methods," The Journal of the Operational Research Society, vol. 55, No. 9, Sep. 2004, pp. 936-956 (Abstract).
Smith et al., "Collaborative Approaches to Research," HEFCE Fundamental Review of Research Policy and Planning, Final Report, Apr. 2000, pp. 1-117.
William E. Souder, "Analytical Effectiveness of Mathematical Models for R&D Project Selection," Management Science, vol. 19, No. 8, Application Seires, Apr. 1973, pp. 907-923 (Abstract).
J. Altmann et al., "Cooperative Software Development: Concepts, Model and Tools," Technology of Object-Oriented Languages and Systems, 1999, pp. 1-14.
Shou-Qi Cao et al, "Research on Resource Scheduling for Development Process of Complicated Product," Computer Supported Cooperative Work in Design, 2005. Proceedings of the Ninth International Conference on, vol. 1, pp. 229-233 (Abstract).
Ming Chen et al., "Research on Organization Method of Development Activities for Complicated Product," Computer Supported Cooperative Work in Design, 2005. Proceedings of the Ninth International Conference on, vol. 1, pp. 234-239 (Abstract).
Luckham et al., "Event Processing Glossary," Jul. 2008, pp. 1-19. http://complexevents.com.
Dept of Health and Human Services Agency for Healthcare Research and Quality, "AHRQ Quality Indicators—Patient Safety Indicators—Technical Specifications," 2012, pp. 1-149. http://www.qualityindicators.ahrq.gov.
Wong et al., "Rule-Based Anomaly Pattern Detection for Detecting Disease Outbreaks," AAAI-02 Proceedings, 2002, pp. 1-7.
Grzymala-Busse, "Knowledge Acquisition Under Uncertainty—A Rough Set Approach," Journal of Intelligent and Robotic Systems, 1988 (Abstract).
Schadow et al., "Discussion Paper: Privacy-Preserving Distributed Queries for a Clinical Case Research Network," IEE International Conference on Data Mining Workshop on Privacy, Security, and Data Mining, 2002 (Abstract).
T. Vercauteren et al., "Hierarchical Forecasting of Web Server Workload Using Sequential Monte Carlo Training", IEEE Transactions on Signal Processing, vol. 55, No. 4, pp. 1286-1297, Apr. 2007. (Abstract).
P. Palazzari et al, "Synthesis of Pipelined Systems for the Contemporaneous Execution of Periodic and Aperiodic Tasks With Hard Real-Time Constraints", 18th International Parallel and Distributed Processing Symposium, 121. IEEE Comput. Soc, Los Alamitos, CA, USA, 2004, pp. LVI-289. (Abstract).
RL Dillon et al., "Optimal Use of Budget Reserves to Minimize Technical and Management Failure Risks During Complex Project Development", IEEE Transactions on Engineering Management, vol. 52, No. 3, pp. 382-395, Aug. 2005. (Abstract).
U.S. Appl. No. 12/851,995—Non-Final Office Action dated Apr. 25, 2012.
U.S. Appl. No. 12/884,665—Non-Final Office Action dated Apr. 11, 2012.
U.S. Appl. No. 12/875,261—Non-Final Office Action dated Feb. 14, 2012.
K. Vanthournout et al., "A Taxonomy for Resource Discovery", Pers Ubiquit Comput 9, pp. 81-89, 2005.
C. Srisuwanrat et al., "Optimal Scheduling of Probabilistic Repetitive Projects Using Completed Unit and Genetic Algorithms", Proceedings of the 2007 Winter Simulation Conference, pp. 2151-2158, 2007.
S. Bharathi et al., "Scheduling Data-Intensive Workflows on Storage Constrained Resources", Works 09, Portland, OR, pp. 1-10 Nov. 15, 2009.
J. Redondo et al., "Solving the Multiple Competitive Facilities Location and Design Problem on the Plane", Massachusetts Institute of Technology, Evolutionary Computation, vol. 17, No. 1, pp. 21-53, 2009.
H. Van et al., "Autonomic Virtual Resource Management for Service Hosting Platforms", Cloud'09, pp. 1-8 , May 23, 2009.
"Fraternity and Sorority Political Action Committee". [CA. 2005]. In Facebook [Group Page]. Retrieved May 19, 2013, From https://www.facebook.com/fspac/.
U.S. Appl. No. 12/884,665—Decision on Appeal mailed Sep. 29, 2015.
U.S. Appl. No. 12/884,665 Examiner's Answer dated May 16, 2013.
U.S. Appl. No. 12/795,847 Notice of Allowance dated Jun. 5, 2013.
U.S. Appl. No. 12/851,995 Non-Final Office Action dated May 13, 2016.
U.S. Appl. No. 12/851,995 Examiner's Answer dated May 10, 2013.
U.S. Appl. No. 12/851,995 Decision on Appeal Mailed Feb. 16, 2016.
U.S. Appl. No. 13/253,431 Non-Final Office Action dated Nov. 10, 2011.
U.S. Appl. No. 13/253,431 Notice of Allowance dated Oct. 22, 2014.
U.S. Appl. No. 13/253,431 Non-Final Office Action dated Mar. 21, 2014.
U.S. Appl. No. 13/253,431 Non-Final Office Action dated Sep. 11, 2013.
U.S. Appl. No. 13/253,431 Final Office Action dated May 21, 2013.
U.S. Appl. No. 12/903,376 Notice of Allowance dated Dec. 19, 2012.

\* cited by examiner

| MEMBER I | MEMBER II | MEMBER III | MEMBER IV |
|---|---|---|---|
| NON-LINEAR ATTRIBUTE 1 | NON-LINEAR ATTRIBUTE 5 | NON-LINEAR ATTRIBUTE 1 | NON-LINEAR ATTRIBUTE 5 |
| NON-LINEAR ATTRIBUTE 2 | NON-LINEAR ATTRIBUTE 2 | NON-LINEAR ATTRIBUTE 2 | NON-LINEAR ATTRIBUTE 1 |
| NON-LINEAR ATTRIBUTE 3 | NON-LINEAR ATTRIBUTE 3 | NON-LINEAR ATTRIBUTE 3 | NON-LINEAR ATTRIBUTE 3 |
| NON-LINEAR ATTRIBUTE 4 | NON-LINEAR ATTRIBUTE 6 | NON-LINEAR ATTRIBUTE 7 | NON-LINEAR ATTRIBUTE 4 |

FIG. 3

DESCRIBING A PARADIGMATIC MEMBER OF A TASK DIRECTED COMMUNITY IN A COMPLEX HETEROGENEOUS ENVIRONMENT BASED ON NON-LINEAR ATTRIBUTES

BACKGROUND

The present disclosure relates to the field of computers, and specifically to the use of computers in allocating human resources. Still more particularly, the present disclosure relates to the use of computers in allocating human resources through the use of non-linear attributes of human resources. In one embodiment, the present disclosure operates within the environment of computerized databases.

SUMMARY

A computer implemented method, system, and/or computer program product define a paradigmatic member of a known task directed community. A processor marks non-linear attributes of each member of a known cohort by marking fields associated with the non-linear attributes in a database used to store information about members of the known cohort, where the known cohort is a task directed community that has a known agenda, where each of the non-linear attributes is individually unrelated to the known agenda, and where there is no logical nexus between any of the non-linear attributes and a particular person's membership in the known cohort. The processor utilizes marked fields in the database to identify common non-linear attributes that are shared by multiple members of the known cohort, and defines a paradigmatic member of the known cohort based on the common non-linear attributes of the members of the known cohort and at least one constraint on the known cohort. The processor maps the paradigmatic member of the known cohort to the common non-linear attributes of the members of the known cohort and the at least one constraint on the known cohort for storage of same, and tags the paradigmatic member in the database for future retrieval.

BRIEF DESCRIPTION OF THE DRAWINGS

FIG. 3 and FIG. 4 illustrate exemplary sets of attributes for known members in a known cohort.

DETAILED DESCRIPTION

Figure 1:
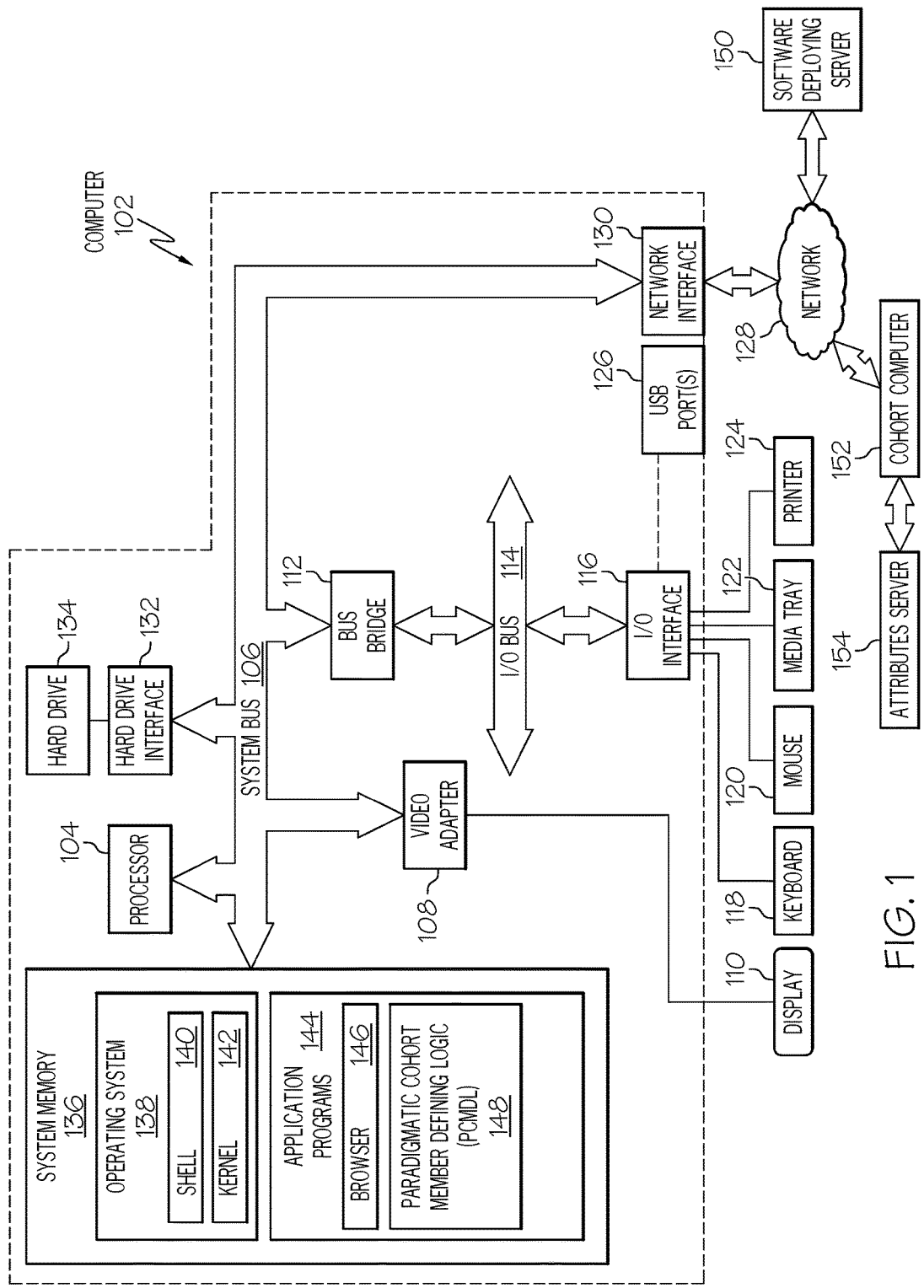
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, cohort computer 152, and/or attributes server 154.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a paradigmatic cohort member defining logic (PCMDL) 148. PCMDL 148 includes code for implementing the processes described below, including those described in FIGS. 2-4. In one embodiment, computer 102 is able to download PCMDL 148 from software deploying server 150, including in an on-demand basis, wherein the code in PCMDL 148 is not downloaded until needed for execution to define and/or implement the improved enterprise architecture described herein. Note further that, in one embodiment of the present invention, software deploying server 150 performs all of the functions associated with the present invention (including execution of PCMDL 148), thus freeing computer 102 from having to use its own internal computing resources to execute PCMDL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
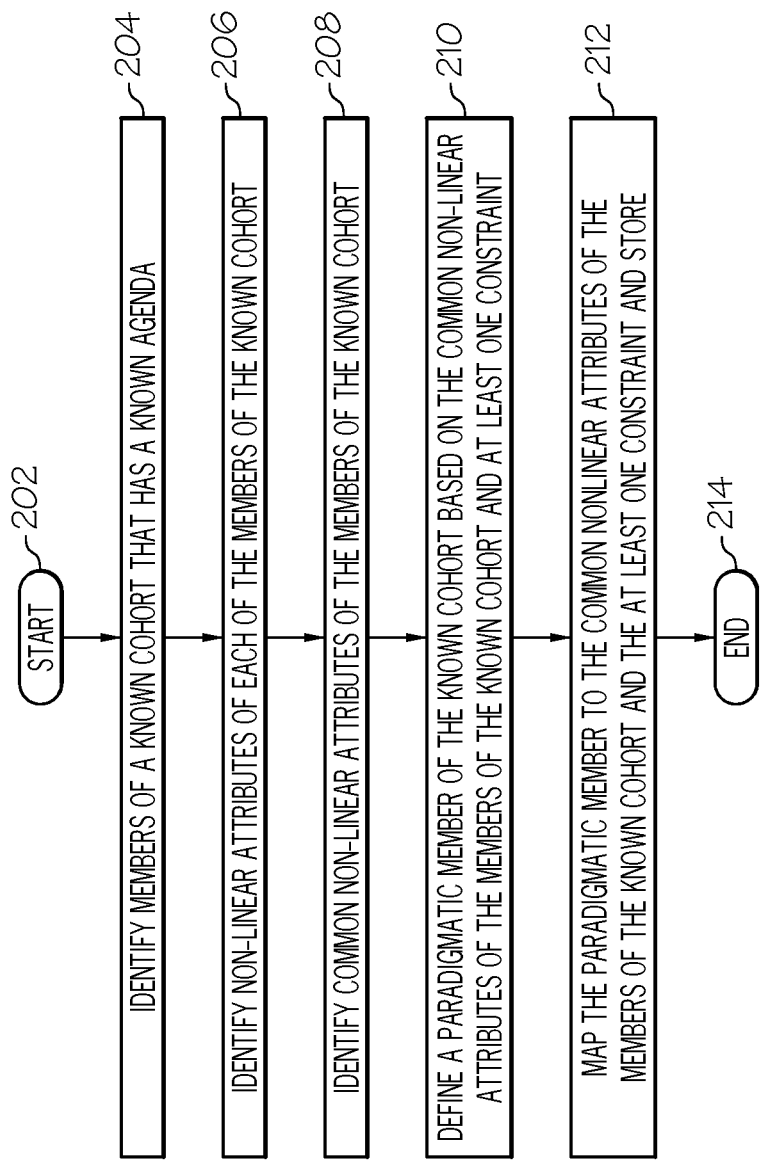
FIG. 2 is a high level flow chart of one or more steps taken by a processor to create and store a paradigmatic member of a known cohort.

Referring now to FIG. 2, a high level flow chart of one or more steps taken by a processor to create and store a paradigmatic member of a known cohort is presented. After initiator block 202, members of a known cohort, which has a known agenda, are identified (block 204). One example of a cohort, including a known cohort, is a task directed community, such as a political action group, a community services group, a social club, etc. Their known agenda may be deduced from the cohort's mission statement, press releases, affiliation with other organizations, websites, publications, contributions, conferences, etc. For example, assume that the known cohort (task directed community) is a highway beautification club that is dedicated to picking up garbage from public highways. The members can be identified by a membership roster of the club. If the club is more loosely organized, then members can be identified by mass e-mailings from a leader of the club, mailing lists, web-posted sign-in sheets to meetings, etc.

As described in block 206, non-obvious or even unrelated attributes (i.e., non-linear attributes) of each member of the cohort are identified and supplied by a computer, such as cohort computer 152 shown in FIG. 1, as received from an attribute source, such as attributes server 154. The non-linear attributes may be marked/identified by marking a field in a database that is used to store information about members of the cohort. The non-linear attributes are defined as attributes that are each, individually, logically unrelated to the known agenda of the cohort. For example, assume that a member of the highway beautification club has the following attributes: 1) a college degree; 2) a subscription to a national newspaper; 3) at least one dependant; and 4) an annual income of less than $40,000/year. There is no logical nexus between any or all of these attributes and the fact that this person is a member of a cohort devoted to highway beautification. Nonetheless, if one or more non-linear attributes are shared by members of the known cohort (block 208), then a paradigmatic member can be defined based on these non-linear attributes and at least one constraint (block 210). This paradigmatic member is defined as a modeled person that has an interest/capacity/ability to be a participating member of that known cohort (or a similar cohort having a similar agenda/constraints), subject to a specific combination of non-linear attributes and at least one constraint.

The constraint is a requirement of the cohort itself. Exemplary constraints are that members live within a pre-defined geographical area (i.e., within a predetermined radius of a meeting location of the cohort), that each member has some predetermined license/credential necessary for participating in the activities of the cohort, that the members are all over a certain age, etc. Thus, once a candidate paradigmatic member is defined based on his/her non-linear attributes (which are unrelated to the agenda of the cohort), then this candidate paradigmatic member may be further filtered out based on the linear constraints of the cohort itself.

In order to determine what describes a paradigmatic member from known members of the cohort, in one embodiment a Bayesian analysis is used. This Bayesian analysis assumes that a new candidate member for either the known cohort or a new (but similar) cohort is being considered for membership. For example, assume that A represents the event that a candidate being considered will be a good member of a new cohort that is similar to a known cohort, and B represents the event that the candidate has the same attributes as a paradigmatic member of the known cohort. This results in the Bayesian probability formula of:

$$P(A \mid B) = \frac{P(B \mid A) * P(A)}{P(B)}$$

where:
P(A|B) is the probability that a candidate person will be a good member of a similar cohort (A) given that (|) the new person has the same attributes as the paradigmatic member (B);
P(B|A) is the probability that a known member of the known cohort has the same attributes as the paradigmatic member;
P(A) is probability that the candidate person will be a good member of the similar cohort regardless of any other information; and
P(B) is the probability that the new person will have the same attributes as the paradigmatic member regardless of any other information.

For example, assume that three out of four members (Members I-IV) of the known cohort had the same attributes as a paradigmatic member that has been defined as holding Attributes 2-3, as shown in section 302 of Table 300 shown in FIG. 3. Thus, P(B|A)=3 out of 4=0.75. Assume also that the odds that the new person will be a good member of the known or a similar cohort regardless of any other information (P(A)) is 0.10, and that the probability that the new person will have the same attributes (Attributes 1 and 2) as the paradigmatic member regardless of any other information (P(B)) is 0.12. The probability that a candidate person will be a good member of the similar cohort given that the candidate person has the same attributes as the paradigmatic member is 62%:

$$P(A \mid B) = \frac{.75 * .10}{.12} = .62$$

Figure 4:
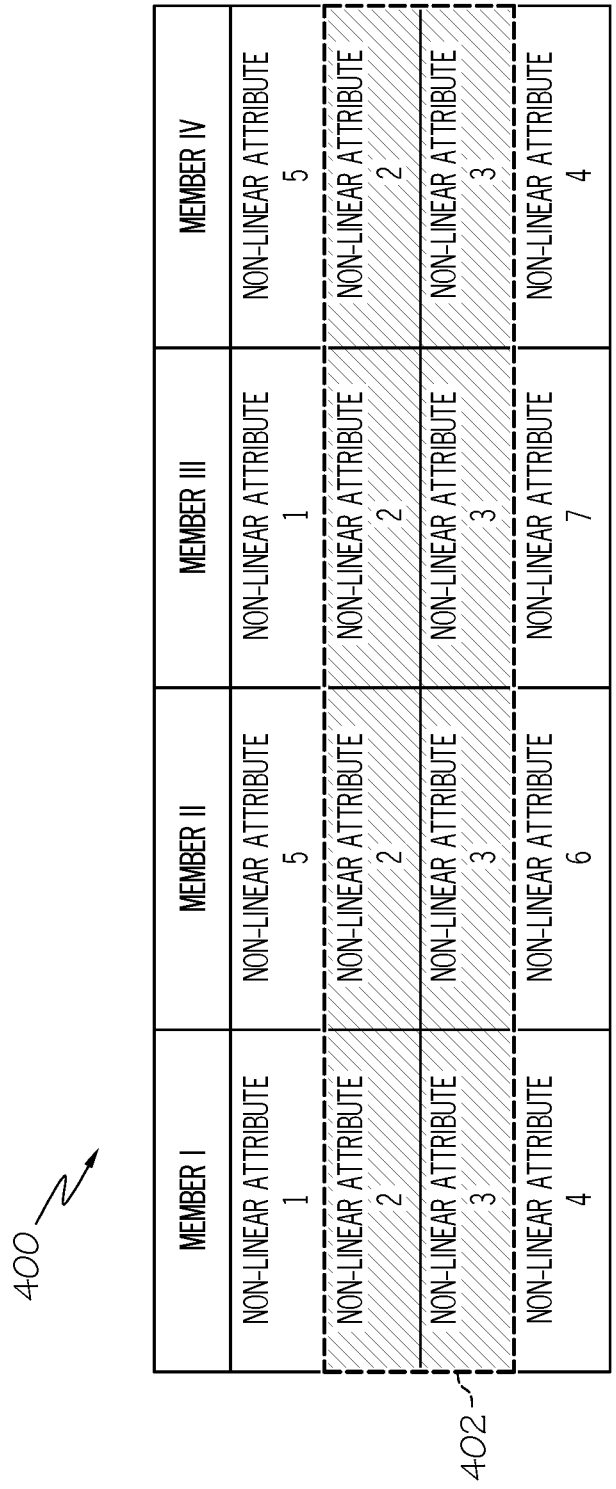

However, if all four members of the known cohort held the same attributes as the paradigmatic member (P(B|A)=1.0), as shown in section 402 of Table 400 shown in FIG. 4, then the probability that a candidate person will be a good member of the similar cohort, given that the candidate person has the same attributes as the paradigmatic member, is now 83%:

$$P(A \mid B) = \frac{1.0 * .10}{.12} = .83$$

Thus, shared non-linear attributes among more members increase the accuracy of describing a paradigmatic member. Similarly, an increase in the number of shared attributes among members also increases the accuracy of describing a paradigmatic member (P(A|B)), since members of the known cohort sharing more attributes causes the probability that a candidate person (for the known cohort or a similar cohort) will have the same attributes as the paradigmatic member regardless of any other information (P(B)) to decrease. Therefore, in one embodiment, a minimum number of common non-linear attributes for members of the known cohort are defined, such that the definition of the paradigmatic member is limited to a person holding at least the defined minimum number of common non-linear attributes.

Returning to FIG. 2, once the paradigmatic member is defined, this paradigmatic member is mapped to the common non-linear attributes of members of the known cohort and the constraint of the cohort, and is stored for future use (block 212). In one embodiment, this mapping includes adding a tag to the entry for the paradigmatic member for ease of future retrieval. For example, assume that, based on the known agenda and constraints on the known cohort, members of the known cohort hold a individual interest in public beautification (which is pre-defined as including painting building murals, planting trees in public spaces, picking up garbage from public spaces and roadways, working to restrict billboard locations, etc.). A tag, such as a descriptor text, is added to the entry for the paradigmatic member. An exemplary tag/descriptor text may be "public beautification." Thus, when another cohort, which is devoted to public beautification in any of the exemplary embodiments just described, is searching for new members, that other cohort may search for the tag "public beautification" to locate the appropriate paradigmatic member model. The process ends at terminator block 214.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A processor implemented method of defining a paradigmatic member of a task directed community, the computer implemented method comprising:
   a processor marking non-linear attributes of each member of a known cohort by marking fields associated with the non-linear attributes in a database used to store information about members of the known cohort, wherein the known cohort is a task directed community that has a known agenda, wherein each of the non-linear attributes is individually unrelated to the known agenda, and wherein there is no logical nexus between any of the non-linear attributes and a particular person's membership in the known cohort;
   the processor utilizing marked fields in the database to identify common non-linear attributes that are shared by multiple members of the known cohort;
   the processor defining a paradigmatic member of the known cohort based on the common non-linear attributes of the members of the known cohort and at least one constraint on the known cohort;
   the processor mapping the paradigmatic member of the known cohort to the common non-linear attributes of the members of the known cohort and said at least one constraint on the known cohort for storage of same; and
   the processor tagging the paradigmatic member in the database for future retrieval.

2. The processor implemented method of claim 1, further comprising:
   the processor identifying a political action group as the task directed community.

3. The processor implemented method of claim 1, further comprising:
   the processor deducing the known agenda of the task directed community from a mission statement of the task directed community, press releases issued by the task directed community, an affiliation between the task directed community and other organizations, a website of the task directed community, and conferences produced by the task directed community.

4. The processor implemented method of claim 1, further comprising:
   the processor defining a minimum number of common non-linear attributes for members of the known cohort; and
   the processor limiting a definition of the paradigmatic member to a person holding at least the defined minimum number of common non-linear attributes.

5. The processor implemented method of claim 4, wherein the minimum number of common non-linear attributes is less than all attributes of members of the known cohort.

6. The processor implemented method of claim 1, further comprising:
   the processor defining said at least one constraint as a requirement that a member of the known cohort be a member of an organization that is devoted to the known agenda of the known cohort.

7. The processor implemented method of claim 1, further comprising:
   the processor assigning a descriptor text to the paradigmatic member, wherein the descriptor text describes an area of individual interest held by the paradigmatic member.

8. A computer program product for defining a paradigmatic member of a task directed community, the computer program product comprising a non-transitory computer readable storage medium having program code embodied therewith, the program code readable and executable by a processor to perform a method comprising:

marking non-linear attributes of each member of a known cohort by marking fields associated with the non-linear attributes in a database used to store information about members of the known cohort, wherein the known cohort is a task directed community that has a known agenda, wherein each of the non-linear attributes is individually unrelated to the known agenda, and wherein there is no logical nexus between any of the non-linear attributes and a particular person's membership in the known cohort;

utilizing marked fields in the database to identify common non-linear attributes that are shared by multiple members of the known cohort;

defining a paradigmatic member of the known cohort based on the common non-linear attributes of the members of the known cohort and at least one constraint on the known cohort;

mapping the paradigmatic member of the known cohort to the common non-linear attributes of the members of the known cohort and said at least one constraint on the known cohort for storage of same; and tagging the paradigmatic member in the database for future retrieval.

9. The computer program product of claim 8, wherein the method further comprises:

identifying a political action group as the task directed community.

10. The computer program product of claim 8, wherein the method further comprises:

deducing the known agenda of the task directed community from a mission statement of the task directed community, press releases issued by the task directed community, an affiliation between the task directed community and other organizations, a website of the task directed community, and conferences produced by the task directed community.

11. The computer program product of claim 8, wherein the method further comprises:

defining a minimum number of common non-linear attributes for members of the known cohort; and limiting a definition of the paradigmatic member to a person holding at least the defined minimum number of common non-linear attributes.

12. The computer program product of claim 11, wherein the minimum number of common non-linear attributes is less than all attributes of members of the known cohort.

13. The computer program product of claim 8, wherein the method further comprises:

defining said at least one constraint as a requirement that a member of the known cohort be a member of an organization that is devoted to the known agenda of the known cohort.

14. The computer program product of claim 8, wherein the method further comprises:

assigning a descriptor text to the paradigmatic member, wherein the descriptor text describes an area of individual interest held by the paradigmatic member.

15. A computer system comprising:
one or more processors;
one or more computer readable memories; and
one or more non-transitory computer readable storage mediums, wherein program instructions are stored on at least one of the one or more non-transitory storage mediums for execution by at least one of the one or more processors via at least one of the one or more computer readable memories to perform a method comprising:

marking non-linear attributes of each member of a known cohort by marking fields associated with the non-linear attributes in a database used to store information about members of the known cohort, wherein the known cohort is a task directed community that has a known agenda, wherein each of the non-linear attributes is individually unrelated to the known agenda, and wherein there is no logical nexus between any of the non-linear attributes and a particular person's membership in the known cohort;

utilizing marked fields in the database to identify common non-linear attributes that are shared by multiple members of the known cohort;

defining a paradigmatic member of the known cohort based on the common non-linear attributes of the members of the known cohort and at least one constraint on the known cohort;

mapping the paradigmatic member of the known cohort to the common non-linear attributes of the members of the known cohort and said at least one constraint on the known cohort for storage of same; and tagging the paradigmatic member in the database for future retrieval.

16. The computer system of claim 15, wherein the method further comprises:

identifying a political action group as the task directed community.

17. The computer system of claim 15, wherein the method further comprises:

deducing the known agenda of the task directed community from a mission statement of the task directed community, press releases issued by the task directed community, an affiliation between the task directed community and other organizations, a website of the task directed community, and conferences produced by the task directed community.

18. The computer system of claim 15, wherein the method further comprises:

defining a minimum number of common non-linear attributes for members of the known cohort; and limiting a definition of the paradigmatic member to a person holding at least the defined minimum number of common non-linear attributes.

19. The computer system of claim 15, wherein the method further comprises:

defining said at least one constraint as a requirement that a member of the known cohort be a member of an organization that is devoted to the known agenda of the known cohort.

20. The computer system of claim 15, wherein the method further comprises:

assigning a descriptor text to the paradigmatic member, wherein the descriptor text describes an area of individual interest held by the paradigmatic member.

* * * * *